April 22, 1969 T. C. JEDNACZ 3,439,509

RECTIFIER SYSTEM FOR ENERGIZING THERMOELECTRIC LOAD

Filed Nov. 22, 1967

INVENTOR.
Thomas C. Jednacz
BY
James J. Jennings, Jr.
Attorney 3,439,509

RECTIFIER SYSTEM FOR ENERGIZING THERMOELECTRIC LOAD

Thomas C. Jednacz, York, Pa., assignor to Borg-Warner Corporation, Chicago, Ill., a corporation of Delaware Filed Nov. 22, 1967, Ser. No. 685,004
Int. Cl. F25b *21/00*
U.S. Cl. 62—3 5 Claims

ABSTRACT OF THE DISCLOSURE

A rectifier circuit 10 receives A-C energy and, under the regulation of a control unit 12, produces a D-C voltage which energizes a thermoelectric load 17. The rectifier circuit includes SCR's 28, 38 and 48 which are self-commutated upon reversal of the applied A-C voltage, and the same A-C voltage is utilized to fire the different SCR's unless nullified by a hold-off signal. A diode 15 is connected between the conductors 14A, 14B which pass the D-C output of the rectifier to the thermoelectric load, to prevent any back voltage which might be generated by the thermoelectric load from interfering with the self-commutating operation of the rectifier circuit.

*Background of the invention*

Figure 1:
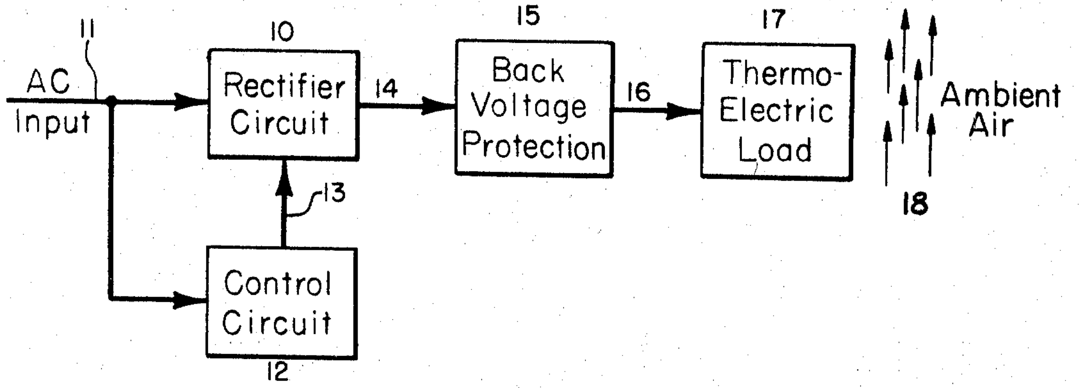

Considerable advances have been made in the field of energizing thermoelectric loads. Generally such a load is termed a thermoelectric module or modules. This refers to at least two, and generally substantially more than two, dissimilar elements connected in an electrical series circuit. When electrical current is passed through this series circuit in a given direction a temperature difference is established at the element junctions. By selective positioning of the components the cooling effect can be concentrated in one area and the heating effect at a separate location. Thus either of the hot or cold areas can be utilized, dependent upon whether heating or cooling is desired, when the thermoelectric load receives the electrical energy.

The reversible operation of the thermoelectric modules is also known. More specifically, if instead of receiving electrical energy a temperature difference is applied across the thermoelectric module then a potential difference is provided and this can be connected to cause current flow through an electrical load. Thus the same thermoelectric module can function either as a load, energized by electrical energy to produce a temperature difference, or as a generator, producing electrical energy when energized by a temperature difference. This reversibility of module operation can sometimes have deleterious effects.

For example when a rectifier system utilizing silicon-controlled rectifiers (SCR's) is connected for energization by A-C energy and for self-commutation when the polarity of the input energy reverses, the D-C output voltage produced by the rectifier is generally passed over a pair of reference conductors to the thermoelectric load. The load or module then produces the required temperature difference but, if a different temperature gradient is applied across the thermoelectric module, the module can become a generator and produce a back voltage of a polarity opposite the polarity of the D-C voltage normally produced by the rectifier circuit. This back voltage is of the proper polarity to maintain the SCR's conductive even when the input A-C voltage reverses polarity, thus preventing the normal self-commutation of such an arrangement. Under these conditions there is no control of the rectifier circuit and thus it is not possible to regulate the level of energization provided by the rectifiers. It is therefore a salient consideration of the present invention to provide means to protect such a self-commutated circuit, coupled to a thermoelectric module, from losing control when the module produces a back voltage.

*Summary of the invention*

The present invention can be utilized as a power supply system energized from an A-C voltage to produce a temperature difference. The system includes a rectifier circuit which is connected to produce a D-C voltage of a given polarity. At least one semiconductor unit is provided in the rectifier circuit, and this unit has input, output and common terminals. The A-C voltage is applied to the output and common terminals so that current is passed through the semiconductor unit when the A-C voltage is of the appropriate polarity and the unit is rendered conductive by receipt of a trigger signal at its input terminal. Passage of current through the semiconductor unit is interrupted when the A-C voltage is of the opposite polarity; thus the system is said to be self-commutating, in that no storage capacitors or independent power supply are utilized to commutate (or turn off) a conducting semiconductor unit. A control circuit is connected to regulate application of the trigger signal to the semiconductor unit input terminal. The thermoelectric module is connected for energization by the D-C voltage produced by the rectifier circuit to provide a temperature difference. However the module is subject to temperature variations in the ambient air such that a back voltage, of a polarity opposite the given polarity, may be produced by the thermoelectric module. This back voltage is applied to the output and common terminals of the semiconductor unit, thus maintaining current flow through this unit even when the applied A-C voltage reverses and is of the opposite polarity.

In accordance with the present invention a protection means is coupled between the rectifier circuit and the thermoelectric module to effectively prevent application of the back voltage to the rectifier circuit. The protection means, which may be a simple diode, insures that conduction and non-conduction of the semiconductor unit is regulated only by the trigger signal and reversal of polarity of the A-C voltage.

*The drawing*

Figure 2:
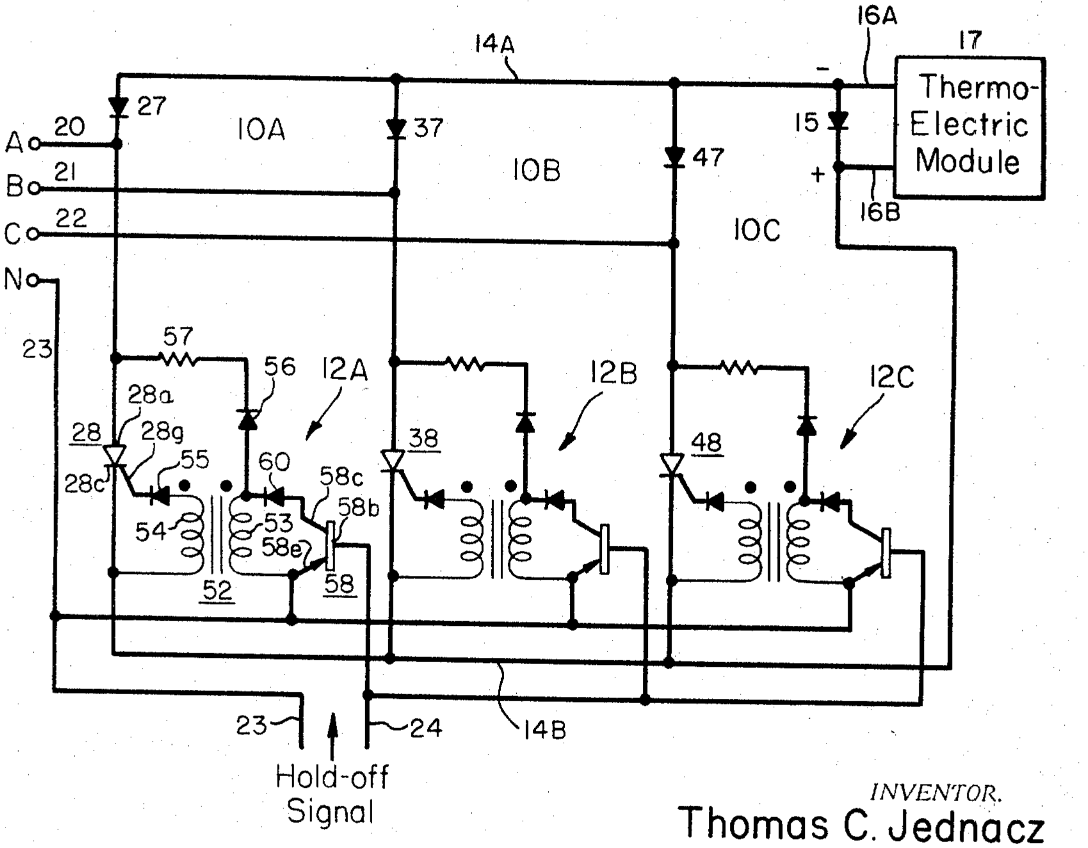

The features of the present invention which are believed to be novel are set forth with particularity in the appended claims. The organization and manner of operation of the invention may best be understood by reference to the following description taken in connection with the accompanying drawings, in both figures of which like reference numerals identify like elements, and in which:

FIGURE 1 is a block diagram illustrating a system utilizing the inventive principles; and FIGURE 2 is a schematic diagram depicting in more detail certain portions of the system shown generally in FIGURE 1.

*General system arrangement, FIGURE 1*

As shown in FIGURE 1 a rectifier circuit 10 is connected for energization by an A-C input voltage received over line 11, and the same input energy is also supplied to a control circuit 12. Suitable triggering or firing signals are provided in a manner now well known by the control circuit, and passed over line 13 to regulate the initiation of conduction of the controllable semiconductor units in the rectifier circuit. Because the rectifier circuit is self-commutating, each controllable semiconductor unit is switched off upon polarity reversal of the A-C voltage received over line 11.

The D-C voltage from rectifier circuit 10 is passed over line 14, back voltage protection unit 15 and line 16 to a thermoelectric load 17, which in turn provides a temperature difference in a well known manner. Ambient air, referenced by the arrows 18 adjacent load 17, is affected by the temperature differences produced upon energization of the thermoelectric module. If the temperature of the ambient air changes sufficiently to cause the thermoelectric load 17 to become a generator and develop a back voltage, protection unit 15 prevents the application of all, or substantially all, of the back voltage to rectifier circuit 10. Without such protection the back voltage would interfere with the self-commutation of the rectifier circuit as the polarity of the A-C input voltage reverses. This protection will now be described in connection with FIGURE 2.

*Detailed circuit description, FIGURE 2*

The rectifier circuit 10 is illustrated as a three-phase circuit including portions 10A, 10B and 10C. Control circuit 12 includes portions 12A, 12B and 12C respectively associated with the corresponding regulated rectifier portions, and includes another portion (not shown) for providing a hold-off signal in a manner to be described for regulating the triggering of the SCR's in the rectifier circuit. The back voltage protection diode 15 is shown coupled between the reference conductors 14A, 14B which pass the D-C voltage from the rectifiers to thermoelectric module 17. This arrangement will now be described in more detail.

Rectifier circuit 10 receives A-C input energy over conductors 20–23 (frequently designated A, B, C and N) and transfers D-C output energy over reference conductors 14A, 14B. First phase circuit 10A includes a unidirectional current conduction means or diode 27 coupled between first input conductor 20 and first output conductor 14A, and a semiconductor unit 28 having input, output and common terminals 28*g*, 28*a* and 28*c*. The output and common terminals 28*a* and 28*c* are coupled between first input conductor 20 and second output conductor 14B in a sense to pass current in the same direction, with respect to the output or reference conductors 14A and 14B, as does diode 27. Semiconductor unit 28 may be transistor, power transistor, silicon-controlled rectifier, or other unit. For purposes of this explanation semiconductor unit 28 will be considered a silicon-controlled rectifier having an input terminal or gate 28*g*, an output terminal or anode 28*a*, and a common terminal or cathode 28*c*.

Portion 12A of control circuit 12 is associated with phase circuit 10A, and is connected to pass current to the control element 28*g* when a potential difference of one polarity is applied between input conductors 20, 23, which polarity is not the appropriate one to effect current flow through SCR 28. Accordingly as soon as the polarity of the voltage between conductors 20 and 23 reverses, because the current flow to gate 28*g* does not cease instantaneously, SCR 28 is triggered on and conducts current from input conductor 20 through the SCR, over output conductor 14B and conductor 16B to the load 17, conductors 16A, 14A, and one of the diodes 37, 47 and its associated input conductor 21 or 22 to the A-C input circuit. Thus absent any regulation by a hold-off signal received over conductors 23, 24, shown coupled to each of the circuits 12A, 12B and 12C, each of the semiconductor switches 28, 38 and 48 will be gated on when current is injected into its gate and then the appropriate polarity potential difference is applied between its anode and cathode, and a D-C output voltage will be passed over output conductors 14A, 14B to the load.

Considering now the portion 12A of the control circuit 12, diode 27 and SCR 28 are coupled in series as already explained. Circuit 12A comprises a transformer 52 having a primary winding 53 and a secondary winding 54, the upper end of secondary winding 54 being coupled through a diode 55 to control element 28*g* of semiconductor switch 28. The other end of secondary winding 54 is coupled to cathode 28*c* and to D-C output conductor 14B.

One end of primary winding 53 is coupled directly to input conductor 23 and the other end of primary winding 53 is coupled through a series circuit, including a diode 56 and a resistor 57, to input conductor 20. Thus it is evident that circuit 12A is coupled between input conductors 20 and 23, and also coupled to gate or control element 28*g* of semiconductor switch 28.

Circuit 12A also includes a switching means or transistor 58 having emitter, base, and collector elements referenced by *e*, *b* and *c*, respectively. Emitter 58*e* is coupled to one end of primary winding 53 and to input conductor 23, and collector 58*c* is coupled through a diode 60 to the common connection between diode 56 and the other end of primary winding 53. Base 58*b* is coupled to a conductor 24 which, with conductor 23, provides a circuit over which a suitable hold-off control signal can be applied. The second and third phase circuits 10B and 10C comprise similar components, and control circuit portions 12B, 12C also include similarly connected components, the interconnection and operation of which will be readily apparent from the explanation of first phase circuit 10A and circuit 12A.

When energized a three-phase A-C potential is applied between the conductors 20, 21, 22 and 23 of the rectifier system. Assuming initially that switching means 58 in circuit 12A is non-conductive and that the potential on input conductor 20 is negative with respect to that on second input conductor 23, current flows from conductor 23 over primary winding 53, diode 56, and resistor 57 to input conductor 20. The windings of transformer 52, as indicated by the polarity dots, provide a potential difference across secondary winding 54 which causes current to flow through diode 55 into gate 28*g* of semiconductor switch 28. However with the potential on its anode negative with respect to its cathode at this time, the semiconductor switch is not rendered conductive.

As soon as the polarity of the potential applied between conductors 20, 23 reverses, the appropriate energizing polarity is provided across anode 28*a* and cathode 28*c* of SCR 28, and current is still being injected into its gate 28*g* by reason of the inductance in the transformer circuit. Accordingly SCR 28 is "fired" precisely at the time when the applied A-C voltage crosses the zero axis and goes positive. The SCR is self-commutated, or turned off, when the applied voltage goes negative. Inspection of the second and third phase circuits 10B and 10C, and circuits 12B and 12C, shows exactly similar operation occurs in those circuits.

It is noted that, once SCR 28 has been prepared for operation by injection of gate current over transformer 52 and diode 55, and then fired as a voltage of the proper polarity appears between conductors 20 and 23, SCR 28 cannot be turned off during the remainder of that cycle as its anode remains positive relative to its cathode. When it is desired to prevent conduction of SCR 28 during that half of the input A-C cycle when its anode is positive with respect to its cathode, a suitable hold-off signal is applied over conductors 23, 24 to render switching means 58 closed or conductive. As transistor 58 conducts it effectively short circuits primary winding 53 and thus there is no significant current flow across transformer 52 to inject current into the gate 28*g* of SCR 28. With no gate current flowing during the half cycle when anode 28*a* is negative with respect to cathode 28*c*, after the polarity reverses semiconductor switch 28 will not be gated on because there is no turn-on signal at its gate. It is noted that even if transistor 58 becomes non-conductive during this latter portion of the input cycle (when anode 28*a* is positive relative to cathode 28*c*), the SCR 28 will still not be switched on because the applied potential difference is not of the proper polarity to effect current flow from the input circuit 20, 23 across transformer 52 to gate 28g. Circuits 12B and 12C have a similar operation in connection with the other phase circuits 10B and 10C.

With the described operation of the rectifier and control circuits, a D-C voltage of given polarity is provided between reference conductors 14A and 14B. This polarity is indicated by the polarity marks near the output portion of the rectifier circuit. This D-C voltage is applied over conductors 16A, 16B to energize thermoelectric module 17.

The temperature of the ambient air may be such as to cause module 17 to become a generator and apply a back voltage over conductors 16A, 16B of a polarity opposite that indicated by the marks in FIGURE 2. This polarity is such that any SCR in the three phase circuits 10A–10C already conducting will be maintained conducting by the back voltage supplied from the thermoelectric module. Continued reversal of the A-C voltage appearing on input conductors 20–23 will be ineffective to turn off the already-conducting SCR's and self-commutation is lost.

In accordance with the present invention a back voltage protection means 15 is coupled as shown between the rectifier phase circuits 10A–10C and thermoelectric module 17. Substantially all of the back voltage is shunted through the protection unit 15, which in the illustrated embodiment is a diode, and any portion of the back voltage which passes to conductors 14A, 14B is not sufficient to maintain the SCR's conducting when the polarity of the input A-C voltage reverses. Accordingly the provision and operation of diode 15 effectively maintains self-commutating operation of the rectifier circuit even when thermoelectric module 17 is reversed and becomes a generator of electrical energy.

While only a particular embodiment has been shown and described, it will be apparent to those skilled in the art that various changes and modifications may be made therein without departing from the invention in its broader aspects. Therefore the aim in the appended claims is to cover all such changes and modifications as may fall within the true spirit and scope of the invention.

What is claimed is:

1. A power supply system for energization from an A-C voltage to produce a temperature difference, comprising: a rectifier circuit connected to produce a D-C voltage of given polarity including at least one semiconductor unit having input, output and common terminals, and means for applying said A-C voltage to the output and common terminals of said semiconductor unit, to pass current through said semiconductor unit when said A-C voltage is of the appropriate polarity and is rendered conductive by receipt of a trigger signal at said input terminal, and to interrupt passage of current through said semiconductor unit when said A-C voltage is of the opposite polarity; a control circuit connected to regulate application of said trigger signal to the input terminal of said semiconductor unit; a thermoelectric module connected for energization by said D-C voltage from the rectifier circuit to provide a temperature difference, which module is subject to temperature variations in the ambient air such that a back voltage, of a polarity opposite said given polarity, can be produced by the thermoelectric module and applied to the output and common terminals of said semiconductor unit to maintain current flow through said unit even when the applied A-C voltage is of said opposite polarity; and protection means, coupled between said rectifier circuit and said thermoelectric module, for effectively preventing application of said back voltage to the rectifier circuit to insure that conduction and non-conduction of the semiconductor unit is regulated only by said trigger signal and polarity reversal of said A-C voltage.

2. A power supply system as claimed in claim 1 in which said protection means is a diode, connected to shunt substantially all of said back voltage and thus prevent interference with turnoff of said semiconductor unit as the polarity of the A-C voltage reverses.

3. A power supply system for energization by an A-C voltage to produce a temperature difference, comprising: a rectifier circuit comprising a pair of reference conductors between which a D-C voltage of given polarity is produced, including at least one silicon-controlled rectifier having gate, anode, and cathode connections, and means for applying said A-C voltage across the anode and cathode connections of said silicon-controlled rectifier, to pass current through said rectifier when the applied A-C voltage is of the appropriate polarity and the rectifier is rendered conductive by receipt of a trigger signal at said gate connection, passage of current through said silicon-controlled rectifier being interrupted when the applied A-C voltage is of a polarity opposite said appropriate polarity; a control circuit connected to regulate application of said trigger signal to the gate connection of said silicon-controlled rectifier; a thermoelectric module coupled to said reference conductors for energization by the D-C voltage of given polarity produced by the rectifier circuit to provide a difference in temperature, which module is subject to temperature variations in the ambient air such that a back voltage of a polarity opposite said given polarity is sometimes produced by said module and applied between said reference conductors, which back voltage is sufficient to maintain said silicon-controlled rectifier conducting even when the applied A-C voltage is of said opposite polarity; and protection means coupled between said reference conductors and connected for conduction in response to application of said back voltage to insure that the back voltage will not be applied to said rectifier circuit to interfere with the commutation of the rectifier circuit.

4. A power supply system as claimed in claim 3 in which said protection means is a diode connected to shunt substantially all of said back voltage and thus prevent interference with commutation of said silicon-controlled rectifier as the polarity of said A-C voltage reverses.

5. A power supply system as claimed in claim 3 in which a diode is coupled in series with said silicon-controlled rectifier between said reference conductors to complete one leg of a three-phase rectifier circuit, and two additional silicon-controlled rectifiers are similarly connected with two additional diodes to provide the second and third legs of the rectifier circuit.

References Cited

UNITED STATES PATENTS

| | | | |
|---|---|---|---|
| 3,107,324 | 10/1963 | Wright | 62—3 |
| 3,111,008 | 11/1963 | Nelson | 62—3 |
| 3,152,451 | 10/1964 | Downs | 62—3 |
| 3,281,073 | 10/1966 | Chou | 62—3 |

WILLIAM J. WYE, *Primary Examiner.*